United States Patent [19]
Morlion et al.

[11] Patent Number: 5,392,371
[45] Date of Patent: Feb. 21, 1995

[54] CONNECTOR ASSEMBLY

[75] Inventors: Danny Morlion, St. Amandsberg; Luc Jonckheere, Leuven, both of Belgium

[73] Assignee: Framatome Connectors International, Paris, France

[21] Appl. No.: 63,447

[22] Filed: May 18, 1993

[30] Foreign Application Priority Data

May 20, 1992 [NL] Netherlands .................. 9200884

[51] Int. Cl.⁶ ............................................ G02B 6/38
[52] U.S. Cl. .................................... 385/52; 385/65; 439/248
[58] Field of Search ............. 439/65, 79, 247, 248, 439/680, 681, 930; 385/14, 76, 77, 83, 65, 129, 131, 52

[56] References Cited

U.S. PATENT DOCUMENTS

| | | | |
|---|---|---|---|
| 4,088,386 | 5/1978 | Hawk | 385/65 |
| 4,323,300 | 12/1979 | Stewart et al. | 385/65 |
| 4,762,390 | 8/1988 | Finzel | 385/59 |
| 4,896,936 | 1/1990 | Stanley | 385/14 |
| 4,934,778 | 6/1990 | Gillett | 385/55 |
| 5,253,310 | 10/1993 | Delbare et al. | 385/14 |

OTHER PUBLICATIONS

Journal of Lightwave Technology, vol. 6, No. 6, Jun. 1988, "Fiber Attachment For Guided Wave Devices" by Murphy E. J., pp. 862–871.

Primary Examiner—Neil Abrams
Attorney, Agent, or Firm—Perman & Green

[57] ABSTRACT

A connector assembly for interconnecting optical and/or electrical conductors comprises a first guiding plate (3) to be embedded in a printed circuit board (1) and a second guiding plate (11). The guiding plates have one or more guiding channels (4, 12) for first conductors and second conductors to be connected with the first conductors respectively. Each conductor includes a contact pad in the main surface of the corresponding printed circuit board or guiding plate. The guiding plates comprise a projection (13, 19) and a slot (16, 21) for mutually positioning the contact pads of the conductors. The projection and slot have co-operating straight reference surfaces (14, 17, 20, 22) located at a predetermined position with respect to the guiding channels and these reference surfaces are pressed together to accurately align the guiding channels of the guiding plates.

7 Claims, 2 Drawing Sheets

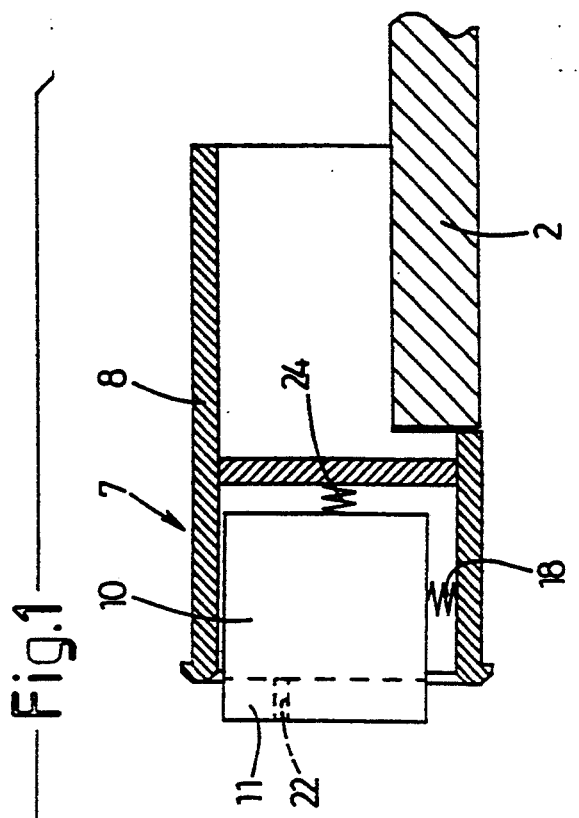
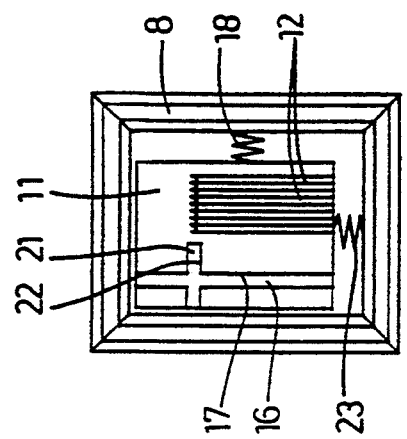
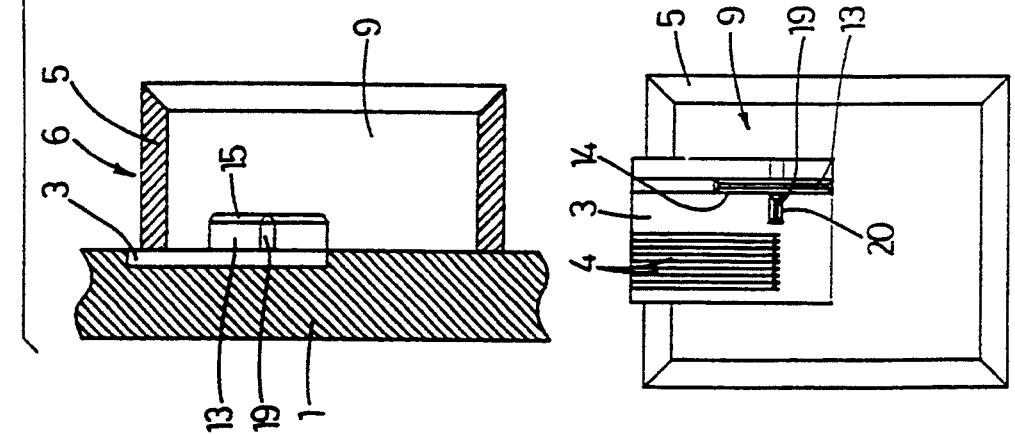

CONNECTOR ASSEMBLY

BACKGROUND OF THE INVENTION

The invention relates to a connector assembly for interconnecting optical and/or electrical conductors.

In view of the ever increasing requirements made in information and telecommunication systems with respect to for example bandwidth and speed of the components used, printed circuit boards are designed recently, in which discrete optical and/or electrical conductors are embedded to obtain connections of high quality. In order to realize connections with such conductors, contact pads of these conductors are made in one plane with the surface of the printed circuit board. Such a contact pad can be obtained for example by bringing a conductor, for example an optical fibre, at least partially out of the surface of the printed circuit board and to remove the projecting part by polishing.

In order to obtain a reliable connection, it is of great importance that the contact pads of the conductors to be interconnected are placed one upon the other with high accuracy. For this purpose it is known to embed a guiding plate in a printed circuit board, which guiding plate has guiding channels in a main surface, said channels gradually ending in this main surface. The conductors are placed in these guiding channels, wherein the projecting ends of the conductors are polished in one plane with the main surface of the printed circuit board. A corresponding guiding plate with conductors for example coming from another printed circuit board or from a conductor cable, is placed upon the first printed circuit board in such a manner that the contact pads of the conductors contact each other. As the diameter of for example optical fibres is only 100–150 microns, in particular the positioning of the guiding plates transverse to the longitudinal direction of the fibres should occur with high accuracy to obtain a reliable connection.

For this purpose it is known to bore two holes one on each side of the guiding channels in the guiding plate embedded in the printed circuit board and to mount pins in these holes after polishing the projecting parts of the conductors, which pins should be received in corresponding holes of the other guiding plate. A disadvantage of this known solution is that realizing the required accuracy is very difficult.

SUMMARY OF THE INVENTION

The invention aims to provide a connector assembly of the abovementioned type wherein the required accuracy for positioning the guiding plates is possible in a relatively simple manner.

To this end the invention provides a connector assembly for interconnecting optical and/or electrical conductors, comprising a first guiding plate to be embedded in a printed circuit board, said guiding plate having one or more guiding channels for first conductors, and a second guiding plate having one or more guiding channels for second conductors to be connected with said first conductors, wherein each conductor includes a contact pad in the main surface of the corresponding printed circuit board or guiding plate, wherein said guiding plates comprise positioning means for mutually positioning the contact pads of the conductors, wherein according to the invention said positioning means comprise a projection and a slot with co-operating straight reference surfaces located at a predetermined position with respect to the guiding channels and wherein means are provided to press together said reference surfaces.

The invention is based on the insight that on the one hand from a manufacturing point of view it is substantially easier to make a reference surface at a location which is predetermined in a very accurate manner with respect to the guiding channels so that by simply pressing together the reference surfaces an accurate position of the contact pads of the conductors transverse to the longitudinal direction of the guiding channels is obtained. On the other hand the positioning means according to the invention provide the possibility to compensate for a relatively high deviation from the desired positioning of the contact pads of the conductors during the movement of the guiding plates towards each other.

According to the invention it is preferable if the positioning means comprise a second projection and a second slot with co-operating straight reference surfaces extending transverse to the longitudinal direction of the guiding channels at a predetermined location with respect to the contact pads of the conductors. Thereby said advantages are also obtained for the positioning in the longitudinal direction of the guiding channels.

In a very simple embodiment the second guiding plate is part of an element mounted in a housing and movable at least transverse to the longitudinal direction of the guiding channels, wherein a first spring exerts a force in this transverse direction on the movable element, wherein preferably a first housing is provided, said housing at least partially surrounding the first guiding plate and comprising a receiving space for receiving the housing of the movable element. In this manner all known techniques of electrical connector assemblies can be advantageously used, wherein by prepositioning of the housing with the second guiding plate in the first housing a rough mutual positioning of the guiding plates is obtained, whereafter the positioning means of the guiding plates realize the positioning with the required accuracy.

Such a solution is also possible for connecting for example a cable to a printed circuit board by using a housing at least partially surrounding the first guiding plate and comprising a receiving space for receiving the second guiding plate wherein said means for pressing together the reference surfaces are accommodated in said housing.

BRIEF DESCRIPTION OF THE INVENTION

The invention will be further explained with reference to the drawings, in which two embodiments of the connector assembly according to the invention are shown very schematically.

FIG. 1 is a cross-section of an embodiment of the connector assembly according to the invention, wherein the connector assembly is shown in the disconnected position.

FIG. 2 is a schematical top view of one part of the connector assembly of FIG. 1, wherein the printed circuit board is not shown.

FIG. 3 is an end view of the other part of the connector assembly of FIG. 1, wherein the printed circuit board is not shown.

Figure 4A:
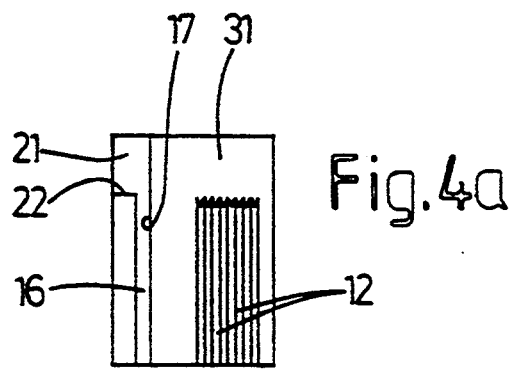
Figure 4B:
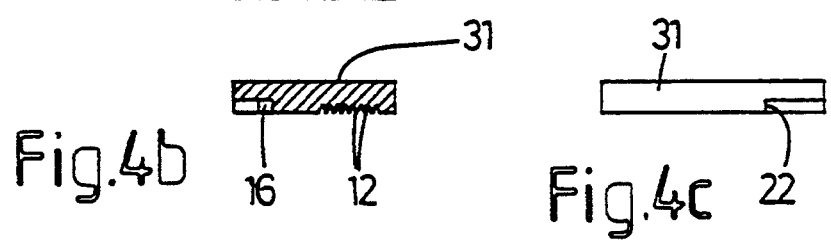
Figure 4C:
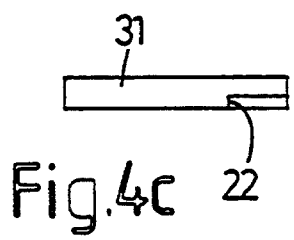

FIGS. 4a–c show different views and a cross-section of one connector part of a second embodiment of the connector assembly according to the invention.

Figure 5A:
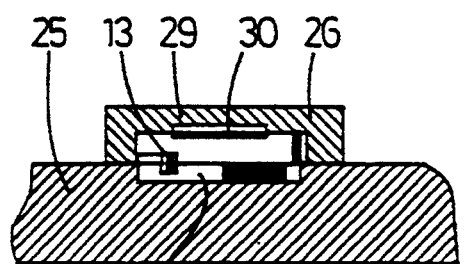
Figure 5B:
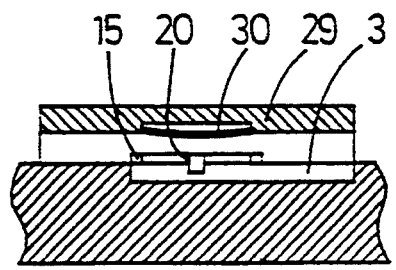
Figure 5C:
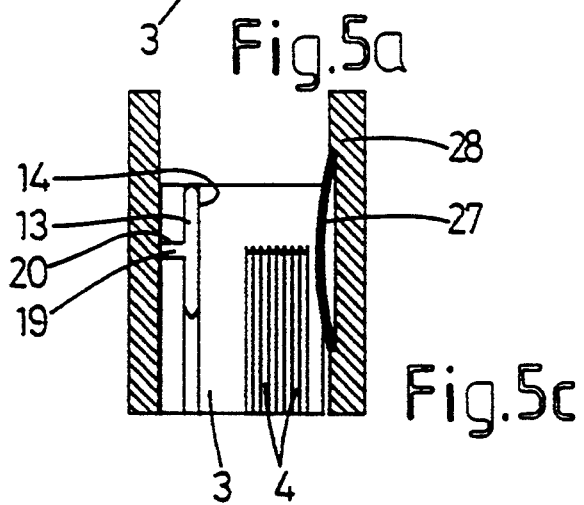

FIGS. 5a–c show different cross-sections of the other connector part of the second embodiment of the connector assembly according to the invention.

DETAILED DESCRIPTION OF THE PREFERRED EMBODIMENTS

FIG. 1 shows a connector assembly for interconnecting the contact pads of optical and/or electrical conductors in an embodiment for realizing connections between printed circuit boards, for example a first printed circuit board 1 and a second printed circuit board 2. Optical fibres are embedded in the printed circuit boards 1 and 2 in a manner known per se and not further shown, which optical fibres of the printed circuit board 1 are provided with contact pads in one plane with the surface of the printed circuit board 1. To this end a first guiding plate 3 is embedded in the printed circuit board 1, wherein the main surface of the guiding plate can be in one plane with the surface of the printed circuit board 1. It is, however, also possible that the main surface of the guiding plate 3 lies below the surface of the printed circuit board 1. Guiding channels 4 are made in the guiding plate 3, wherein an optical fibre is placed in each of said guiding channels 4, so that the position of the optical fibres is determined by the guiding channels 4. These guiding channels 4 extend gradually upwardly to the main surface of the guiding plate 3 so that the ends of the optical fibres are led to this main surface. The parts of the optical fibres projecting out of the printed circuit board 1, are polished in such a manner that they will be positioned in the surface of the printed circuit board 1. The guiding plate 3 together with the housing at least partially surrounding said guiding plate 3, forms a first connector part 6 of the connector assembly.

A second connector part 7 comprises a housing 8 adapted to be received in a receiving space 9 of the housing 5. A movable element 10 is mounted in the housing 8, wherein an end part of the element 10 projecting out of the housing 8 serves as second guiding plate 11. In this guiding plate 11 guiding channels 12 corresponding with the guiding channels 4 are made, which guiding channels 12 also end gradually in the main surface of the guiding plate. The optical fibres embedded in the printed circuit board 2 are led out of the printed circuit board in a manner not further shown and are fixed in the guiding channels 11 so that the position of the optical fibres of the printed circuit board 2 is also determined by the guiding channels 12. The parts of the optical fibres projecting out of the guiding plate 11 are polished in such a manner that contact pads are obtained in the main surface of the guiding plate 11.

In order to realize a good connection between the conductors of the printed circuit board 1 and the printed circuit board 2 it is of great importance that the contact pads of the optical fibres will contact each other accurately, in particular in a direction transverse to the longitudinal direction of the guiding channels 4 and 12 respectively. To this end the guiding plate 3 comprises a projection 13 with a straight reference surface 14 being positioned at a predetermined location which is fixed with very high accuracy with respect to the guiding channels 4. Manufacturing such a straight reference surface at an accurately determined location with respect to the guiding channels 4 is relatively simple from a manufacturing point of view. The projection is provided with aligning edges 15 at the projecting end.

The guiding plate 11 is provided with a slot 16 with a straight reference surface 17 being positioned at the same predetermined location which is also fixed with high accuracy with respect to the guiding channels 12. If the connector parts 6, 7 are brought into the assembled position, the housings 5, 8 are first positioned with respect to each other, whereby a rough positioning is obtained. The element 10 is mounted movably in three directions within the housing 8, so that the projection 13 by co-operation with the slot 16 brings the guiding plates 3 and 11 into the mutual correct position, wherein a spring 18 presses the reference surface 17 against the reference surface 14. Thereby the guiding channels 4 and 12 are aligned accurately and the contact pads of the conductors are accurately positioned with respect to each other in a direction transverse to these guiding channels.

Positioning in the longitudinal direction of the guiding channels 4, 12 is obtained in a corresponding manner by means of a projection 19 with a straight reference surface 12. This projection 19 is also provided with aligning edges 15. The guiding plate 11 has a slot 21 with a straight reference surface 22. A spring presses the reference surface 22 of the slot 21 against the reference surface 20 of the projection 19. Thereby the mutual position of the guiding channels 4, 12 in the longitudinal direction is also accurately determined and the contact pads of the conductors are also accurately positioned with respect to each other in the longitudinal direction.

Finally a spring 24 provides a pressing together of the contact pads of the conductors in the assembled position of the connector assembly.

In the described connector assembly the known alignment techniques of known electrical connector assemblies are advantageously used. The housings 5 and 8 are provided with aligning edges in the manner shown in the drawing, whereby insertion of the housing 8 in the receiving space 9 of the housing 5 does not provide any problems even in applications in a rack system. The guiding plate 11 is movably mounted in the housing 8 by means of the element 10, so that the guiding plate 11 is brought into the required accurately determined position with respect to the guiding plate 3 by co-operation of the projections 13 and 19 with slots 16 and 21.

FIGS. 4 and 5 show both connector parts of an embodiment of the connector assembly according to the invention for connecting for example an optical fibre cable to optical fibres embedded in a printed circuit board 25. In the same manner as in the printed circuit board 1 the guiding plate 3 with guiding channels 4 for the optical fibres is embedded in this printed circuit board 25. In this case a housing 26 having a reverse U-shape in cross-section is provided, said housing 26 bridging the guiding plate 3. A spring element 27 is mounted in the housing 26 in an inner wall 28 extending parallel to the guiding channels 4 of the guiding plate 3. A spring element 30 is provided in an upper wall 29.

FIGS. 4a–c show a guiding plate 31, which is mainly made in the same manner as the guiding plate 11. This guiding plate 31 is provided with guiding channels 12 for the optical fibres of the fibre cable not shown. The slot 16 with the reference surface 17 is provided in the guiding plate 11. The slot 21 of the guiding plate 31 joins in this case the slot 16. The reference surface 22 of the slot 21 operates as a stop surface co-operating with the reference surface 20 of the projection 19 of the guiding plate 3. As seen in FIG. 5, the two projections 13 and 19 are integral with each other.

For realizing a connection between the optical fibres of the fibre cable and the optical fibres of the printed circuit board 25 the guiding plate 31 is inserted into the housing 26 from the left side according to the view of FIG. 5b, wherein the spring element 27 presses the reference surface 17 of the slot 16 against the reference surface 14 of the projection 13. The aligning edges 15 are provided in this case at the longitudinal ends of the projection 13. The reference surface 22 of the slot 21 meets with the reference surface 20 of the projection 19. The spring element 30 presses together the contact pads of the conductors.

Although the guiding plate 31 is not mounted in a housing in the embodiment of FIGS. 4 and 5, it is of course also possible to mount the guiding plate 31 in a suitable housing.

Therefore the invention is not restricted to the embodiments as described above, which can be varied in a number of ways within the scope of the claims.

What is claimed is:

1. A connector assembly for interconnecting optical conductors comprising:
   two guiding plates each having guide channels for the optical conductors to be located therein; and
   means for positioning the two guiding plates against each other at a precise predetermined relative position, the means for positioning comprising the plates having pairs of co-operating projections and slots, a first one of the pairs having a first projection and a first slot angled relative to a second projection and a second slot of a second one of the pairs, wherein the first and second projections are on the first guiding plate and, are generally straight and perpendicular to each other.

2. A connector assembly as in claim 1 wherein a first one of the guiding plates is adapted to be embedded in a printed circuit board.

3. A connector assembly as in claim 1 wherein the first and second slots are on a second one of the guiding plates and, are generally straight and intersect each other.

4. A connector assembly for interconnecting optical conductors comprising:
   two guiding plates each having guide channels for the optical conductors to be located therein; and
   means for positioning the two guiding plates against each other at a precise predetermined relative position, the means for positioning comprising the plates having pairs of co-operating reference surfaces, a first one of the pairs of co-operating surfaces being angled relative to a second one of the pairs of co-operating surfaces, wherein a first one of the guiding plates is adapted to be embedded in a printed circuit board, and the first pair of co-operating surfaces are on first and second projections on the first guiding plate and, are generally straight and perpendicular to each other.

5. A connector assembly as in claim 4 wherein the second pair of co-operating surfaces are formed by first and second slots on a second one of the guiding plates and, are generally straight and intersect each other.

6. An assembly as in claim 4 wherein the first and second projections are integral with each other.

7. A connector assembly for interconnecting optical conductors comprising:
   two guiding plates each having guide channels for the optical conductors to be located therein; and
   means for positioning the two guiding plates against each other at a precise predetermined relative position, the means for positioning comprising the plates having pairs of co-operating projections and slots, a first one of the pairs having a first projection and a first slot angled relative to a second projection and a second slot of a second one of the pairs, wherein the first and the second slots are on a second one of the guiding plates and, are generally straight and intersect each other.

* * * * *